United States Patent
He et al.

(10) Patent No.: US 10,002,270 B2
(45) Date of Patent: *Jun. 19, 2018

(54) ADAPTIVE PROCESSING OF RADIO FREQUENCY IDENTIFICATION

(71) Applicant: International Business Machines Corporation, Armonk, NY (US)

(72) Inventors: Liang He, Xian (CN); Zhen Duo Liu, Xian (CN); Chun Lei Xu, Xian (CN); Geng Wu Yang, Xian (CN); Feng Zheng, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/662,775

(22) Filed: Jul. 28, 2017

(65) Prior Publication Data

US 2017/0323127 A1    Nov. 9, 2017

Related U.S. Application Data

(63) Continuation of application No. 15/073,932, filed on Mar. 18, 2016.

(51) Int. Cl.
*G06K 7/10* (2006.01)

(52) U.S. Cl.
CPC .................. *G06K 7/10366* (2013.01)

(58) Field of Classification Search
CPC .................................. G06K 7/10366
USPC ....................................... 340/10.5
See application file for complete search history.

(56) References Cited

U.S. PATENT DOCUMENTS

| | | |
|---|---|---|
| 8,284,033 B2 | 10/2012 | Moran |
| 8,830,064 B1 | 9/2014 | Stanford et al. |
| 8,830,065 B1 | 9/2014 | Stanford et al. |
| 9,104,923 B1 | 8/2015 | Stanford et al. |
| 2007/0067325 A1 | 3/2007 | Weitzner et al. |
| 2007/0202005 A1 | 8/2007 | Maschke |
| 2011/0115633 A1* | 5/2011 | Morris .................. B01L 3/5027 340/572.8 |
| 2013/0214903 A1* | 8/2013 | Kalous ..................... G05B 1/01 340/5.61 |
| 2013/0229265 A1 | 9/2013 | Sajadi et al. |
| 2014/0009291 A1 | 1/2014 | Requist et al. |
| 2015/0145652 A1 | 5/2015 | Weidinger |

OTHER PUBLICATIONS

He et al., Pending U.S. Appl. No. 15/073,932, filed Mar. 18, 2016, Titled "Adaptive Processing of Radio Frequency Identification", pp. 1-29.
IBM: List of IBM Patents or Patent Applications Treated as Related (Appendix P), Aug. 17, 2017, pp. 1-2.

(Continued)

*Primary Examiner* — Yong Hang Jiang
(74) *Attorney, Agent, or Firm* — Michael O'Keefe

(57) ABSTRACT

Embodiments of the present disclosure relate to adaptive RFID communication. A tag device includes a storage configured to store content that is executable by a proxy device associated with a reader device. The tag device includes a communication component configured to transmit the content to the reader device, the content, when executed by the proxy device, causing an action associated with the tag device to be performed.

1 Claim, 4 Drawing Sheets

(56) References Cited

OTHER PUBLICATIONS

Vogt, H., "Multiple Object Identification with Passive RFID Tags," IEEE International Conference on Systems, Man and Cybernetics (SMC '02), Oct. 20012, 6 pages, https://vs.inf.ethz.ch/publ/papers/smc02rfid.pdf.

* cited by examiner

ADAPTIVE PROCESSING OF RADIO FREQUENCY IDENTIFICATION

BACKGROUND

Radio frequency identification (RFID) is the wireless use of electromagnetic fields to transfer data, for the purposes of automatically identifying and tracking tags attached to objects. The RFID tags may contain information electronically stored therein. Some tags are powered by electromagnetic induction from magnetic fields produced near the reader. Some types collect energy from the interrogating radio waves and act as a passive transponder. Other types have a local power source such as a battery and may operate at hundreds of meters from the reader. Unlike a barcode, the tag does not necessarily need to be within line of sight of the reader and may be attached to or embedded in the tracked object.

RFID tags have been widely used. For example, an RFID tag attached to an automobile during production can be used to track its progress through the assembly line; RFID-tagged pharmaceuticals can be tracked through warehouses; and implanting RFID microchips in livestock and pets allows positive identification of animals. In most cases, the behavior pattern between the tags and reader is single and defined in advance. As used herein, the behavior pattern defines one or more actions to be done when the reader identifies the tag. For example, in a warehouse, the stock size is modified once the reader receives identification data sent by the certain type of RFID tags. There are also some kinds of tags that work with different communication channels but with the same or similar principle of operations.

SUMMARY

Example embodiments of the present disclosure provide methods and devices for adaptive RFID processing.

In an aspect, a tag device is provided. The tag device includes storage configured to store content that is executable by a proxy device associated with a reader device; and a communication component configured to transmit the content to the reader device, the content, when executed by the proxy device, causing an action associated with the tag to be performed.

In another aspect, a reader device is provided. The reader device includes a receiver configured to receive, from a tag device, content contained in the tag; and a proxy interface coupled to a proxy device and configured to provide the received content to the proxy device, the content being executable by the proxy device.

In yet another aspect, a method is provided. The method comprises receiving, at a proxy device, content from a reader device, the content being executable by the proxy device and provided by a tag device to the reader device; and causing the content to be executed.

It is to be understood that the Summary is not intended to identify key or essential features of embodiments of the present disclosure, nor is it intended to be used to limit the scope of the present disclosure. Other features of the present disclosure will become easily comprehensible through the description below.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
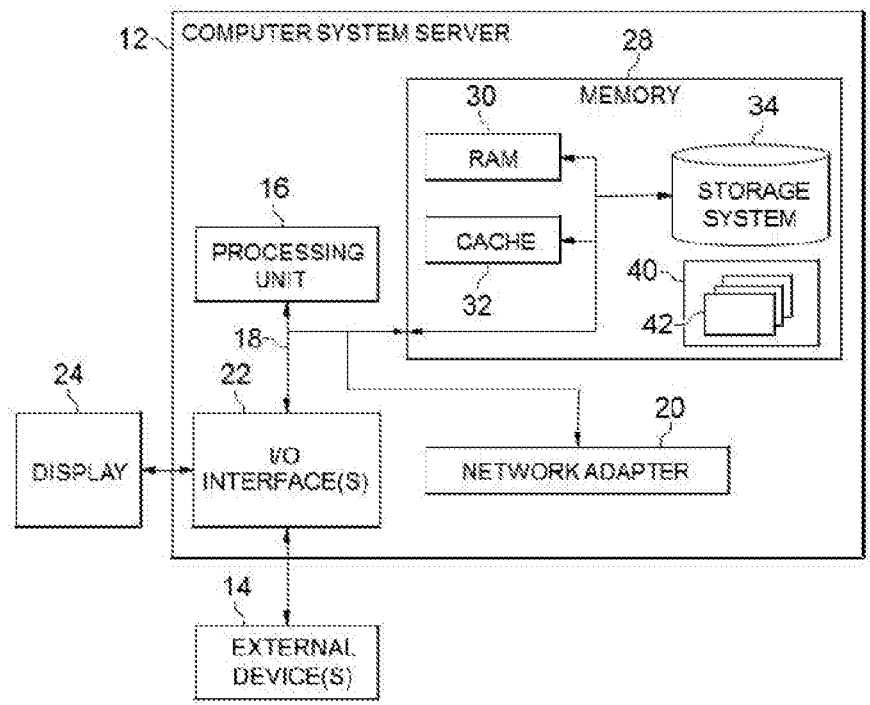
FIG. 1 is a block diagram illustrating an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
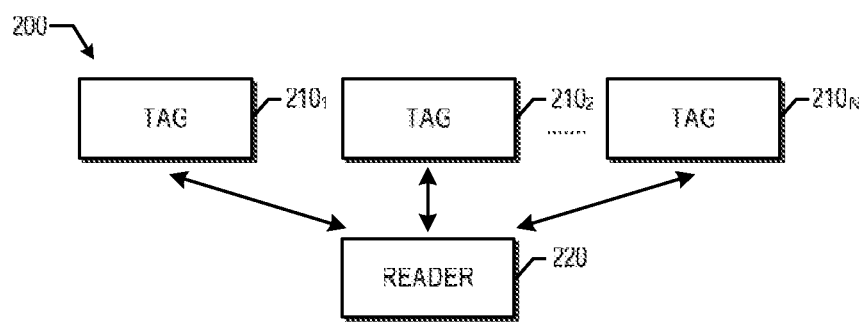
FIG. 2 is a block diagram illustrating a RFID system, in accordance with an embodiment of the present disclosure.

FIG. 2 is a block diagram illustrating an RFID system 200. For ease of discussion, in the following embodiments of the present disclosure will be discussed with reference to RFID. It is to be understood that the example RFID embodiments do not imply any limitations as to the scope of the present disclosure. Principle and idea of the present disclosure apply to any other tag and reader devices that work on the basis of the same or similar mechanism, either currently known or to be developed in the future.

As shown, the system 200 includes one or more tag devices such as RFID tags 210-1, 210-2, . . . , 210-N (collectively referred to as "RFID tag" or "RFID tags" 210). The RFID tags 210 may be attached to or embedded in their respective objects, for example. Each RFID tag 210 stores information therein and is capable of communicating with a reader device such as a RFID reader 220. For example, in some embodiments, the tag information is stored in a non-volatile memory. The RFID tags 210 may include either fixed or programmable logic for processing stored and/or received information.

The RFID tags 210 can be passive, active or battery-assisted passive. An active RFID tag 210 has an on-board battery and periodically transmits its identification data which can be received by the reader 220. A battery-assisted passive (BAP) RFID has a battery on board and can be activated by the RFID reader 220. A passive RFID tag 210 has no battery and instead uses the radio energy transmitted by the RFID reader 220. The RFID tags 210 may either be read-only, having a factory-assigned serial number that is used as a key into a database, or may be read/write where object-specific data can be written. Some field programmable RFID tags 210 may be written once and read multiple times. In some embodiments, the RFID tags 210 may contain a circuit and an antenna. The circuit stores and processes information, modulates and demodulates a radio frequency (RF) signal, collects energy from the RFID reader 220, and performs other specialized functions. The antenna receives and transmits signals.

In operation, the RFID reader 220 may transmit an encoded radio signal to interrogate the tags. The RFID tags 210 receive the signal and then respond with their identification data and possibly other information. Conventionally, the behavior pattern between a RFID tag 210 and the reader 220 is defined and fixed in advance. That is, the RFID reader 220 should know the operation(s) to be performed for a RFID tag 210. For example, in a warehouse, the RFID tags 210 and reader 220 may be used in combination to manage the stock size. More particularly, once the RFID reader 220 receives identification data sent by the RFID tags 210, the stock size can be modified accordingly.

In an open environment, however, there might be multiple objects with different kinds of RFID tags 210. These RFID tags 210 are associated with different behavior patterns. If the behavior pattern of a certain RFID tag 210 is unknown to the RFID reader 220, the RFID reader 220 cannot processing the information from the RFID tag properly. As a result, the RFID tag will be useless. In order to address this and other potential problems, in accordance with embodiments of the present disclosure, in addition to the identification, the RFID tags 210 at least further includes a piece of executable content.

When communicating with the RFID reader 220, the RFID tags 210 will transmit the executable content to the RFID reader 220, which in turn passes the content to a proxy device. The proxy is capable of executing the content sent by the RFID tags 210. Specifically, it is to be understood that in the context of the present disclosure, execution of the content includes interpretation of the content without compiling. Then the executable content can be executed by the proxy and the processing result (if any) can be output by a suitable interface(s). In this way, even if the RFID reader 220 initially does not know the behavior pattern defined for a RFID tag 210, they can cooperate to provide the user with adaptive and intelligent information processing.

Figure 3:
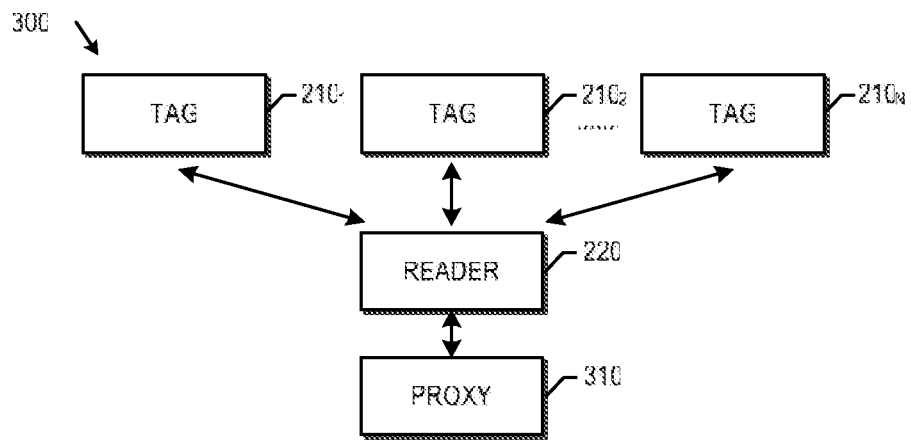
FIG. 3 is block diagram illustrating an adaptive RFID system in accordance with an embodiment of the present disclosure.

FIG. 3 shows a block diagram of an adaptive RFID system 300 in accordance with embodiments of the present disclosure. Compared with the system 200 as discussed in reference to FIG. 2, the system 300 further includes a proxy device 310 that cooperates with the RFID reader 220. For ease of discussion, the proxy device is called "RFID proxy." In operation, the RFID reader 220 receives identification data as well as executable content from one or more RFID tags 210 and forwards the received executable content to the RFID proxy 310. The RFID proxy 310 processes the executable content. For example, the content can be interpreted, compiled, and/or otherwise executed by the RFID proxy 310. Then the RFID proxy 310 can facilitate providing the processing result to the user.

It is to be understood that although the RFID proxy 310 and RFID reader 220 are shown separately in FIG. 3, this is merely for the purpose of illustration without suggesting any limitation as to the scope of the present disclosure. In some embodiments, the RFID proxy 310 may be included in the RFID reader 220. For example, the RFID proxy 310 may be integrated as a part of the RFID reader 220. Alternatively, in other embodiments, the RFID proxy 310 may be implemented separately from the RFID reader 220. For example, in one embodiment, the RFID proxy 310 may be implemented as a module on the computer system/server 12 in communication with the RFID reader 220.

Figure 4:
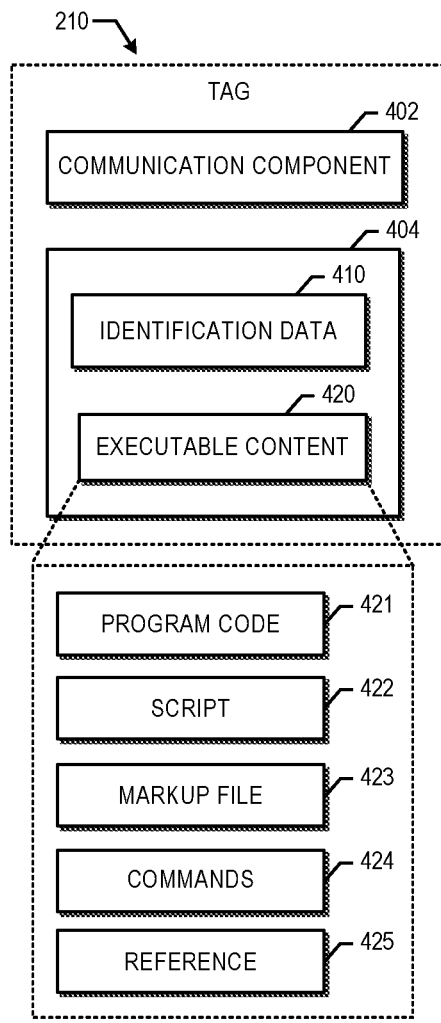
FIG. 4 is block diagram illustrating a RFID tag in accordance with an embodiment of the present disclosure.

FIG. 4 shows a schematic diagram of a RFID tag in accordance with embodiments of the present disclosure. The RFID tag 210 may be implemented as a card or a device in any other suitable form. As shown, the RFID tag 210 includes a communication component 402 and storage 404. The communication component 402 enables communication between the RFID tag 210 and the RFID reader 220. For example, the communication component 402 at least includes a transmitter or a transceiver operating with an antenna(s) for communicating signals with the RFID reader 220. The storage 404 may be any suitable medium and at least stores identification data 410 and content 420 that is executable by the RFID proxy 310. The identification data 410 and the executable content 420 can be transmitted by the communication component 402 from the RFID tag 210 to the RFID reader 220.

The identification data 410 may include any information specific to the RFID tag 210. In some embodiments, for example, the identification data 410 may include a unique serial number, for example. Alternatively, or in addition, the identification data 410 may include product-related information such as a stock number, slot number or batch number, production date, or any other suitable specific information.

In accordance with embodiments of the present disclosure, the executable content 420 is the content that can be executed by the RFID proxy 310. Generally speaking, the executable content 420 may include executable code, or a reference to the executable code. The executable code may include program code, script, commands, or the like. For example, FIG. 4 shows some example content items 421-425, where the content items 421-424 are executable code, and the content item 425 is a reference to executable code. In implementations, the content 420 may include one or more of the content items 421-425.

In some embodiments, the executable content 420 may include program code 421 that can be executed by the RFID proxy 310. The program code 421 can be written by any suitable programming language, including, but not limited to, assembly language and high-level programming language such as Java, C, C++, or the like. In some embodiments, the program code 421 has been complied so that the RFID proxy 310 can execute the program code 421 without compiling. Alternatively, in some embodiments where the RFID proxy 310 has a compiler, the program code 421 may include source code to be complied by the RFID proxy 310.

Alternatively, or in addition, the executable content 420 may include a script(s) 422. The script 422 is a small non-compiled program written by a scripting language such as JavaScript or the like. The script 422 can be processed by a script interpreter invoked by the RFID proxy 310, which will be discussed later. In some embodiments, the content 420 may include a markup file(s) 423 which can be written by markup language such as extensible markup language (XML) or the like. Alternatively, in addition, the content 420 may include plaintext and/or binary commands 424. Specifically, in some embodiments, instead of the executable program code or file itself, the content 420 may contain a reference such as a uniform resource identifier (URI) 425 referencing to executable code such as program code, script, commands, or the like. An example URI is uniform resource locator (URL). Other forms of reference are possible as well.

It is to be understood that the content items 421-425 are only examples of the executable content 420, without suggesting any limitation as to the scope of the present disclosure. In addition to or instead of the content items 421-425 as shown in FIG. 4, the content 420 may include additional and/or alternative content that can be executed by the RFID proxy 310.

Figure 5:
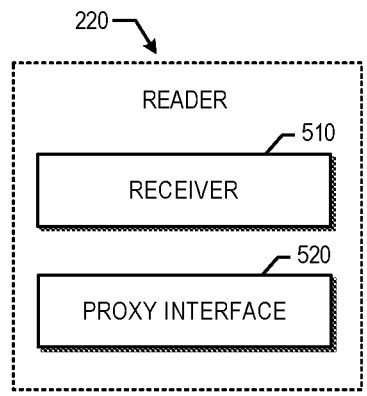
FIG. 5 is block diagram illustrating a RFID reader in accordance with an embodiment of the present disclosure.

FIG. 5 is a block diagram of a RFID reader in accordance with embodiments of the present disclosure. The RFID reader 220 includes a receiver 510 for receiving information from the RFID tag 210. As described above, the received information may include the identification data 410 and the content 420 contained in the RFID tag 210. The RFID reader 220 further includes a proxy interface 520 via which the content 420 of the RFID tag 210 is forwarded to the RFID proxy 310.

If the RFID reader 220 and the proxy 310 are co-located (for example, the RFID proxy 310 is included in the RFID reader 220), the proxy interface 520 may be an inter-application interface such as an inter-process interface, for example. Alternatively, in those embodiments where the RFID reader 220 and the proxy 310 are remotely located from one another, the proxy interface 520 may be a remote communication interface such as a radio receiver or a computer network interface.

Figure 6:
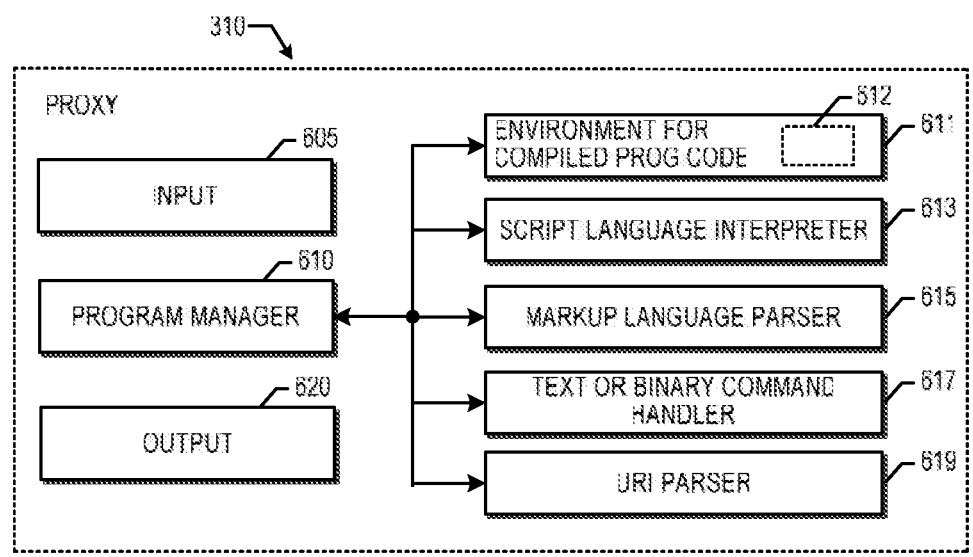
FIG. 6 is block diagram illustrating a RFID proxy in accordance with an embodiment of the present disclosure.

FIG. 6 is a block diagram of the RFID proxy 310 in accordance with embodiments of the present disclosure. Generally speaking, the RFID proxy 310 receives the executable content 420 of the RFID tag 210 from the RFID reader 220 and causes the content 420 to the executed, as described above. To this end, the RFID proxy 310 may be implemented as a general platform including or invoking a collection of programs or modules for storing, managing, executing, and/or interpreting the content 420. For example, depending on the type of the received content, the RFID proxy 310 may dispatch the content to the proper module(s).

In the embodiments shown in FIG. 6, the RFID proxy 310 includes an input 605 for receiving the executable content 420 from the RFID reader 220. In those embodiments where the RFID reader 220 and the RFID proxy 310 are located in the same machine, the input 605 may be an interface between different applications such as an inter-process interface. Alternatively, if the RFID proxy 310 is implemented separately from the RFID reader 220, the input 605 may be a telecommunication or network interface, for example.

The RFID proxy 310 further includes a program manager 610 which contains, invokes, and/or otherwise controls one or more modules for processing the content 420. The modules may include, for example, running environments for program code, interpreters and/or subprograms for executing, interpreting and/or processing the executable content 420. Upon receipt of the executable content 420 that is forwarded by the RFID reader 220, the RFID proxy 310 may dispatch the content 420 to one or more proper modules for execution.

By way of example, the modules that can be involved by the program manager 610 may include one or more of the following: an environment 611 for running program code, a script language interpreter 613, a markup language parser 615, a handler 617 for processing plaintext and/or binary commands, a URI parser 619, or the like.

The environment 611 may be used to support execution of complied program code. In those embodiments where the code in the RFID tag 210 has been complied, the code can be directly run in the environment 611. On the other hand, if the code sent by the RFID tag 210 is not complied, the environment 611 may include or invoke a compiler 612 to compile the source code for execution. The script language interpreter 613 may translate the commands contained in a script into machine-executable instructions and cause the instructions to be executed. The markup language parser 615 may be used to parse and execute the markup content, and the handler 617 may be used to process and execute the plaintext/binary commands. Specifically, if the content 420 sent by the RFID tag 210 includes a URI 425 such as a URL referencing to target content, the URI parser 619 may parse the URI to retrieve the target content stored at the location specified by the URI. Then the retrieved target content can be executed.

It is to be understood that any suitable technologies, either currently known or to be developed in the future, can be used for each of modules 611-619. Moreover, the modules 611-619 are discussed merely for illustration, without suggesting any limitation as to the scope of the present disclosure. Any additional and/or alternative modules can be invoked by the RFID proxy 310.

In some embodiments, the RFID proxy 310 further includes an output 620. If execution of the content 420 results in any outcome to be presented to a user, the output 620 may facilitate the output of the outcome. In some embodiments, the output 620 includes a user interface(s) suitable for providing the result. Alternatively, or in addition, the output 620 may work with the RFID reader 220 and/or any other suitable devices (not shown) in the user's environment to interact with the user.

In accordance with embodiments of the present disclosure, the content 420, when executed by the RFID proxy 310, can implement a variety of functionalities. For example, in some embodiments, the RFID proxy 319 may manage information about the object to which the RFID tag 210 is attached. For example, the information of the object can be added into a list for management. Alternatively, or in addition, the RFID proxy 310 may determine one or more actions associated with the object and facilitate performing these actions. In some embodiments, the RFID proxy may determine a condition for the actions and cause the actions to be performed if the condition is met. The condition may be a time condition, location condition, physical context condition (such as weather, temperature, or the like), and/or any other suitable conditions. Example embodiments will be described in the following paragraphs. In some further embodiments, the RFID proxy 310 may obtain one or more properties of the object of a user to which the tag is attached. Then, using the properties, it is possible to detect a potential conflict(s) between the object and one or more further objects owned by or otherwise associated with the user.

Two examples of the present disclosure will now be discussed. In a first example, it is assumed that Alice borrows from the library a book having an attached RFID tag. Conventionally, the RFID tag can only work with the RFID reader located in the library, for example, to record lending of the book. When Alice brings the book to her home, the RFID tag of the book will be completely useless even there is a RFID reader at Alice's home. This is because the RFID reader at home does not know the behavior pattern for this certain type of RFID tag.

In accordance with embodiments, the RFID tag with the book contains the executable content 420 such as a piece of compiled program code. When Alice brings the book back to home, the RFID tag of the book and the RFID reader at home may communicate with one another. At this point, the program code carried by the RFID tag is transmitted to the home RFID reader which in turn forwards the program code to the associated RFID proxy. The RFID proxy may be located in a host machine such as Alice's personal computer or portable computer, for example. In one embodiment, the program code, when executed, sets a timer according to the lending time of the book. For example, the timer may be set to expire at a certain point (for example, one week) before it is due to return the book to the library. When the timer expires, the host machine may provide Alice with an indication that the book should be returned to the library.

In another example, Bob's house is equipped with a RFID reader and a RFID proxy in accordance with embodiments of the present disclosure. By containing different kinds of executable content in the RFID tags, different objects brought by Bob to his house can be processed properly. For example, if Bob borrows a book from a friend, the executable content in the attached RFID tag may set a timer to remind Bob to return the book in time, just like the example described above. If Bob buys a book, the executable content in the RFID tag may add information of the book, such as the author, purchase time, category or the like, into a family book list. In this way, Bob can retrieve the book easily in the future. The RFID tag attached to food may provide Bob with the expiration date. In addition, when Bob buys medicine, a piece of program contained in the attached RFID tag may be transmitted to the RFID reader and, when executed by the RFID proxy, detects whether there is a conflict between the medicine and any food that has been brought by Bob. If so, an alert may be provide to Bob.

Through the above discussions, it would be appreciated that in accordance with embodiments of the present invention, the behavior pattern between the RFID tags and RFID reader does not necessarily have to be predefined and fixed. Instead, the RFID reader and proxy may act adaptively according to the executable content in the RFID tag, thereby providing more flexibility and intelligence. It is no longer necessary to predefine the behavior pattern at the RFID reader side. Instead, the RFID reader is able to process multiple different kinds of RFID tags attached to various objects.

Figure 7:
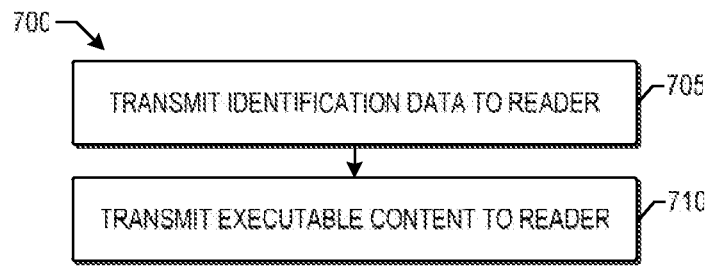
FIG. 7 is a flowchart illustrating a method implemented at a RFID tag in accordance with an embodiment of the present disclosure.

FIG. 7 is a flowchart illustrating a method 700 implemented at a RFID tag 210 in accordance with embodiments of the present disclosure. In step 705, the RFID tag 210 transmits the stored identification data 410 to a RFID reader 220. In step 710, the RFID tag 210 transmits to the RFID reader 220 the content 420 that is executable by a RFID proxy 310. It is to be understood that the order of steps 705 and 710 is not limited to the embodiment shown in FIG. 7. In other embodiments, the executable content 420 can be transmitted to the RFID reader 220 prior to or in parallel with the identification data 410.

Figure 8:
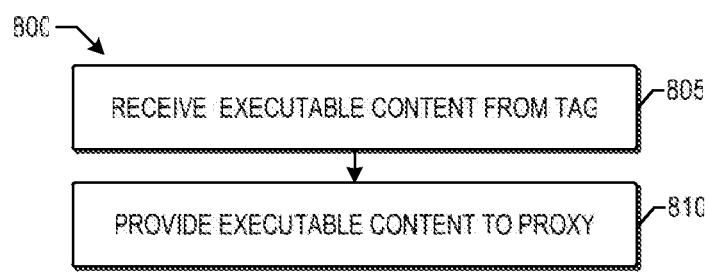
FIG. 8 is a flowchart illustrating a method implemented at a RFID reader in accordance with an embodiment of the present disclosure.

FIG. 8 is a flowchart illustrating a method 800 implemented at a RFID reader 220 in accordance with embodiments of the present disclosure. In step 805, the RFID reader 220 receives executable content 420 from a RFID tag 210. The received information may also include the identification data 410 of the RFID tag 210. In step 810, the RFID reader 220 forwards the received executable content 420 to a RFID proxy 310 for execution. The RFID proxy 310 and the RFID reader 220 may be co-located or located remotely from one another.

Figure 9:
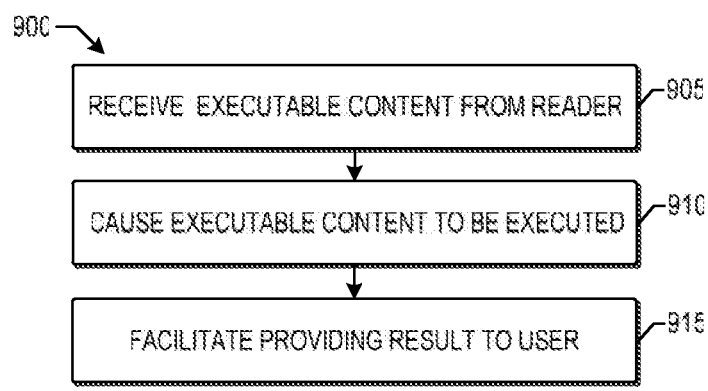
FIG. 9 is a flowchart illustrating a method implemented at a RFID proxy in accordance with an embodiment of the present disclosure.

FIG. 9 is a flowchart illustrating a method 900 implemented at a RFID proxy 310 in accordance with embodiments of the present disclosure. In step 905, the RFID proxy 310 receives content 420 from a RFID reader 220, where the content 420 is contained in a RFID tag 210 and transmitted to the RFID reader 220. In step 910, the RFID proxy 310 causes the received content 420 to be executed. In step 915, if there is any result to be provided to a user, the RFID proxy 310 facilitates presenting the result to the user.

Again, it is to be understood that though the principle of present disclosure is discussed with reference to RFID tags, readers and proxy, embodiments of the present disclosure apply to any other communication mechanism where tag and reader devices communicate data or information. By executing the content in the tag device by a proxy device associated with the reader device, more flexibility and intelligence can be achieved.

The present disclosure may be a system, an apparatus, a device, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, at a proxy device, an executable content from a reader device, wherein the executable content is a program code executable by the proxy device associated with the reader device, and wherein the executable content being executable by the proxy device and provided by a tag device to the reader device, wherein the tag device comprises:
        a storage configured to store the executable content, wherein the storage is further configured to store identification data specific to the tag device that is executable by the proxy device associated with the reader device;
        a communication component configured to transmit the executable content to the reader device, wherein the executable content, when executed by the proxy device, causing an action associated with the tag device to be performed;
        a radio frequency identification (RFID) tag, wherein the communication component is configured to transmit the executable content to the RFID reader via a radio frequency (RF) channel in response to detecting energy from the reader device;
    wherein the reader device comprises:
        a receiver configured to receive, from a tag device, the executable content contained in the tag device;
        a proxy interface coupled to the proxy device and configured to provide the received executable content to the proxy device, the executable content being executable by the proxy device;
    causing the executable content to be executed, by the proxy device, wherein causing the executable content to be executed comprises:
        retrieving, by the proxy device, executable code from a location specified by a reference to the executable code, the reference being included in the received executable content;
        dispatching, by the proxy device, the retrieved executable code to a respective module for execution;
        obtaining a property of an object to which the tag device is attached, the object being associated with a user; and
        detecting, based on the property, a conflict between the object and a further object associated with the user; and
    causing a result to be provided, by the proxy device, to the user via a device in an environment associated with the user, the device being separated from the proxy device.

* * * * *